Feb. 28, 1928. J. G. RUCKELSHAUS Re. 16,892

MAGNETIC MOTOR

2 Sheets-Sheet 1

Original Filed June 11, 1926

INVENTOR
JOHN G. RUCKELSHAUS
BY
Frank O. Fischer
ATTORNEY

Feb. 28, 1928. J. G. RUCKELSHAUS Re. 16,892

MAGNETIC MOTOR

2 Sheets-Sheet 2

Original Filed June 11, 1926

INVENTOR
JOHN G. RUCKELSHAUS
BY
Frank C. Fischer
ATTORNEY

Reissued Feb. 28, 1928. Re. 16,892

UNITED STATES PATENT OFFICE.

JOHN GREER RUCKELSHAUS, OF NEWARK, NEW JERSEY.

MAGNETIC MOTOR.

Original No. 1,622,255, dated March 22, 1927, Serial No. 115,176, filed June 11, 1926. Application for reissue filed January 6, 1928. Serial No. 245,005.

This invention relates to prime movers and more particularly to devices for producing continuous rotary movement in a rotative part by an electric current.

One of the main features of the invention is to provide means for imparting a slow regular rotary movement to a turntable of considerable weight by the oscillation of an armature, actuated intermittently by an electro-magnet to which current is conducted through an automatic circuit breaker by which the magnet is controlled.

A further object is in the provision of a noiseless device for transmitting the movement of the armature to a vertical spindle on which the turntable is mounted.

Another aim is to produce a simple, compact apparatus capable of operating continuously for an indefinite period without supervision or care, at a negligible expense, and which is in itself inexpensive to construct and install.

Figure 1:
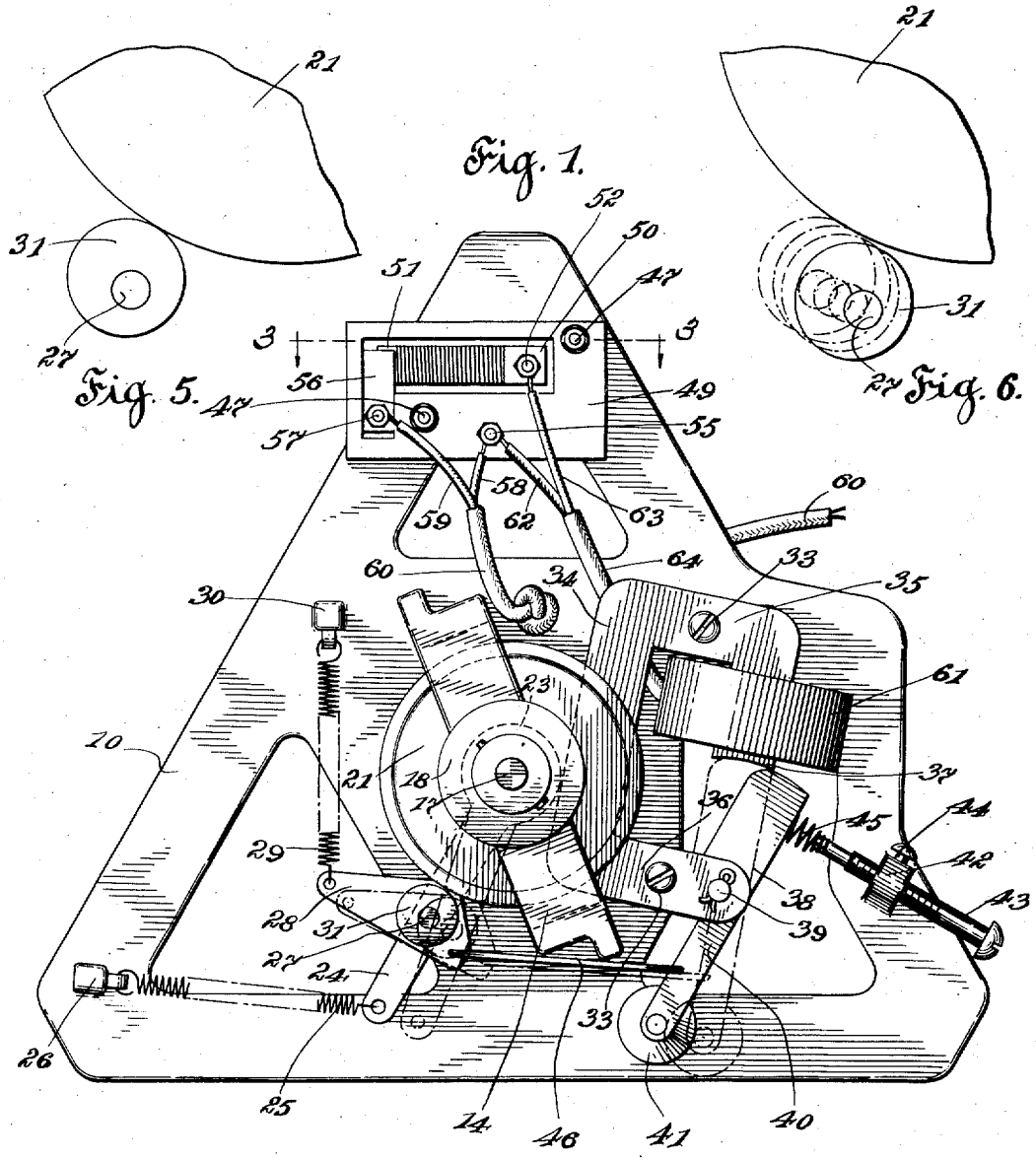
Figure 2:
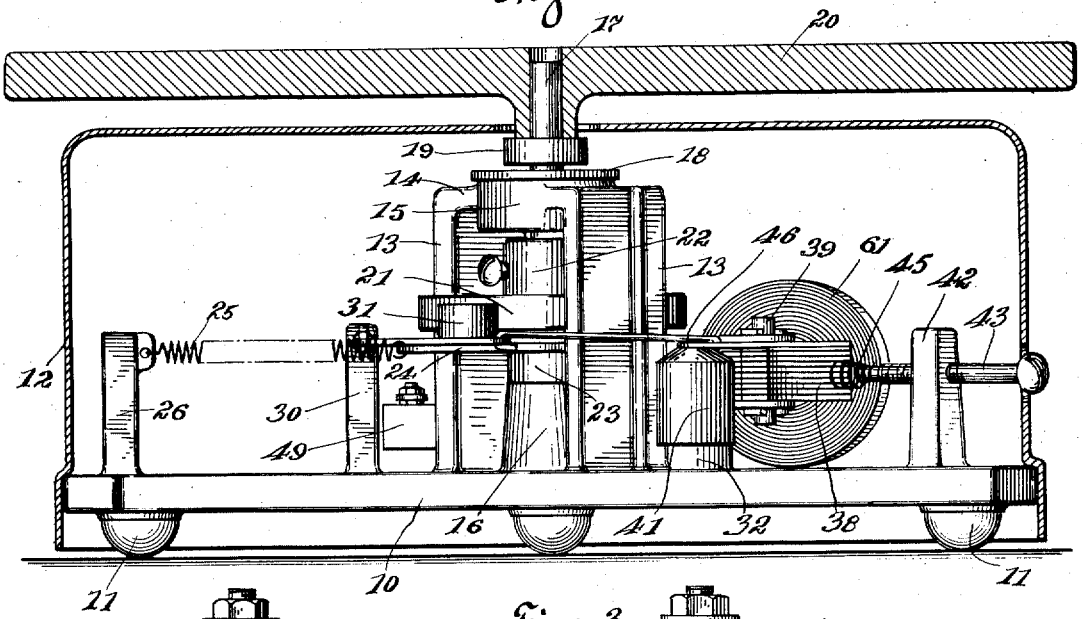
Figure 3:
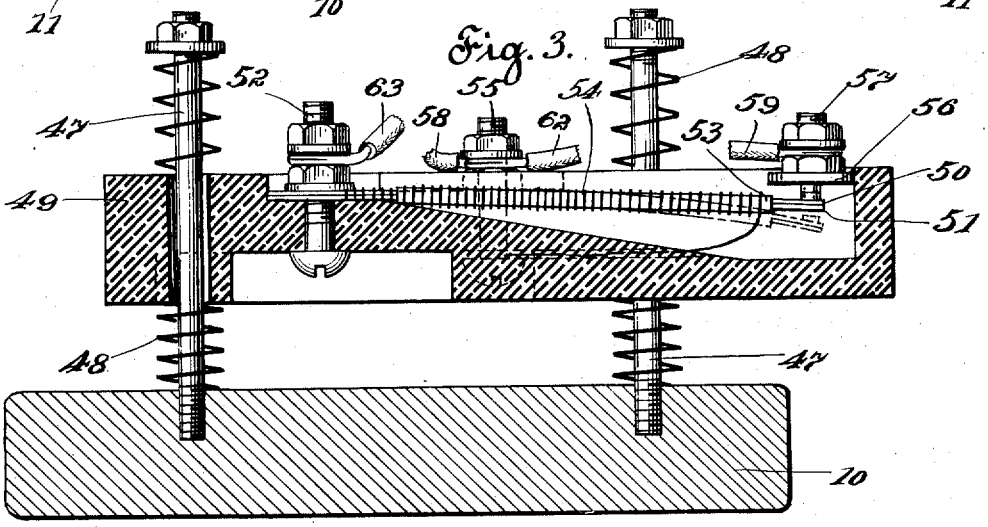
Figure 4:
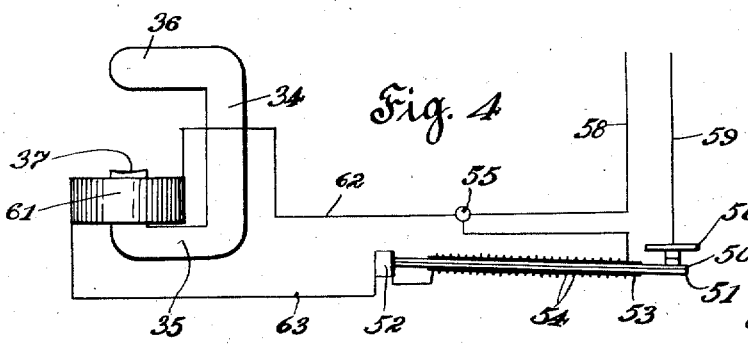

Other valuable and practical features are accomplished by the novel construction and arrangement of parts hereinafter described and illustrated in the accompanying drawings, forming a material part of this disclosure, and in which Fig. 1 is a top plan view of a complete embodiment of the invention, the casing and turntable being omitted, Fig. 2 is a front elevational view of the same, the casing and turntable being shown in section, Fig. 3 is a sectional view taken on line 3—3 of Fig. 1, through the circuit interrupter and drawn to an enlarged scale, Fig. 4 is a diagrammatic view illustrating the circuit wiring, Fig. 5 is a fragmentary plan view of the friction drive means, and Fig. 6 is a similar view showing the several positions of the friction drive means.

The base, designated in the drawings by the numeral 10, is shown as generally triangular, having three semi-spherical insulating supports 11 to rest on any level surface, and enclosed, together with the superstructure, by a thin walled casing 12.

Substantially midway on the base are the supports 13 for a bridge 14 having an enlarged central boss 15 extending slightly above and below and containing a combined annular and thrust bearing, (not shown), the same constituting a standard.

A boss 16, raised from the base in register with the bridge boss 15, is drilled to form a guide bearing for a vertical spindle 17 rotatable in the bearings and provided with a dust cap 18 flanged to extend over the top of the boss 15 covering the bearing therein, and fixed on the spindle, above the cap, is a collar 19.

A turntable 20, composed of a heavy disc having a downwardly extending hub is bored to receive the upper end of the spindle, its hub resting on the collar 19 by which it is removably engaged to permit ready removal at will and transmit rotary motion when in place.

Secured to the spindle 17 below the bridge is an element 21 in the form of a disc having a hub 22, and mounted to rock about the spindle as an axis is a member comprising a hub 23 with an extending arm 24. The element and member co-act to produce rotary movement of the spindle in a manner to be described.

A coiled tension spring 25 engages the end of the arm and an eye carried by a post 26, tending to draw the arm in a clock-wise direction.

Fixed in the arm 24 to extend upwardly is a pivot pin 27 on which is freely mounted a cam plate element 28, disposed normally transverse to the arm, the left hand end of the cam plate being engaged by a tension spring 29 arranged tangentially to the disc and secured to a post 30 rising from the base rearward of the bridge.

Fixed on the plate 28 is a roll 31 eccentrically revoluble on the pivot 27, the roll making contact with the periphery of the disc 21 when the cam plate is drawn by the spring 29 and moved out of contact when the plate is oscillated in the opposite direction for a purpose further on apparent.

On the right hand side of the base are a pair of spaced projections 32 to which is secured by screws 33 a laminated magnet 34 provided with arms 35 and 36 extending at right angles, the arm 35 having an extension 37 disposed parallel to the main portion 34.

A laminated armature 38 is removably pivoted on a pin 39 passing through extensions of the arm 36 and reaching from the armature, opposite the pivot is an arm 40 carrying a counter-weight 41.

A post 42 rising from the base 10 carries an adjustable screw 43 provided with a clamping screw 44 and having at its inner end a spring bumper 45 against which the armature 38 makes contact at the end of its outward oscillative movement.

A link 46 connects the armature arm 40 with the cam plate 28 and it is to be noted that the point of link connection with the plate is such as to give the same an initial oscillatory movement on the pivot 27, stressing the spring 29, preliminary to transmitting movement to the arm 24 and stressing the arm return spring 25, this action releasing the roll 31 from the disc 21 when the arm is swung anti-clock-wise by the armature, the roll, moving with the plate, instantly gripping the disc upon return movement of the arm as indicated in the detail views in Figs. 5 and 6, the foregoing elements completing the purely mechanical details of the apparatus. The springs constitute resilient means opposing the rocking movement of arm 24 in one direction, and the cam roll, the plate 28, etc., provide means for establishing a driving connection between the arm and the disc. The operation of the means is to permit relative movement of the arm and disc in one direction but to prevent such relative movement in the opposite direction.

At the rear of the base are secured two upright rods 47 provided with nuts and washers at their upper ends, each rod having two separate helically coiled springs 48, between the adjacent ends of each pair of which is disposed a non-conducting body 49. This body is formed with clearance openings through which the rods freely pass and is thus floatingly supported so that no shocks or jars may be transmitted to it.

Mounted in the dielectric body 49 are two conducting strips 50 and 51 rigidly held at one end by a clamp bolt 52 and depressible into a recess in the upper portion of the body, these strips being of unlike material, one of which is subject to greater elongation in the presence of heat than the other, whereby movement of the strips at their free ends is attained.

These strips are encased in a heat insulating covering 53 enclosed by a wire coil 54 one end of which is in electrical contact with the bolt 52 and the other end similarly engaged with a bolt 55, see Fig. 3.

A contact plate 56 is normally engaged by the bared free end of the strip 50, the plate being held to the body by a bolt 57.

An electrical current is supplied from any convenient source through insulated wires 58 and 59 held in a conductor cable 60 passing through the base as shown in Fig. 1.

An electro-magnetic coil 61 is wound on the arm 37 of the magnet core, to which current is supplied through wires 62 and 63, connected respectively to the bolts 55 and 52, enclosed in a cable 64.

In operation current enters through conductor 59, bolt 57 and contact plate 56 passes through the thermal elements 50, 51 to the bolt 52 and thence through conductor 63 to coil 61, energizing the electro-magnet and attracting the armature 38.

This action tilts the cam plate 28, releasing the roll 31 from disc 21 and draws the arm 24 against the tension of the spring 25.

At the same time current through the conductor 58, and bolt 55 enters the coil 54 and passes to the bolt 52, heating the coil and causing curvature of the thermal strips and breaking contact with the plate 56 thereby deenergizing the electro-magnet and permitting the pull of the spring 25 to move the armature into the position shown in Fig. 1, the armature being cushioned by contact with the adjustable buffer spring 45. The thermostatic switch affords one convenient means for periodically interrupting the flow of current to the electromagnet.

As the armature is oscillated in one direction, the driving means are rendered effective to establish a connection between the arm and the disc, so that a rotary impulse is imparted to the spindle, and as the turntable is of considerable weight, it acts as a fly-wheel, maintaining an essentially uniform rotary movement during the momentary cessation of advance impulses.

The thermal strips upon breaking contact with the plate 56 quickly cool and automatically renew their contact with the plate, whereupon a continuous succession of impulses is obtained.

Although I have described my improvements with considerable detail and with respect to certain particular forms of my invention, I do not desire to be limited to such details since many changes and modifications may well be made without departing from the spirit and scope of my invention in its broadest aspect.

I claim:

1. A magnetic motor comprising a base having a standard, a vertical spindle rotatable therein, a turntable carried by the spindle, a disc fixed to the spindle, an arm journalled on the spindle, a cam plate pivoted on said arm, an eccentric roll on said plate, resilient means to swing said arm in one direction, means to oscillate said cam plate to cause said roll to engage the periphery of said disc when said arm is moved by said resilient means, an electro-magnet, a pivoted armature drawn by said magnet in a direction opposite to that in which said resilient means acts, said armature being connected to said plate, and means for periodically interrupting current to said magnet.

2. In a device of the class described, the combination with a turntable, a spindle on which the turntable is removably mounted, and means for supporting the spindle, of a friction disc fixed on said spindle, an arm journalled on the spindle, a cam plate pivoted on said arm, a spring urging said arm in one direction, an eccentric roll on said plate, a spring urging said roll against the periphery of said disc, a pivoted lever element connected to said plate to cause oscillation thereof whereby said roll is released from said disc when the element is moved outwardly and coincidently retract said spring actuated arm, and means for oscillating said lever element intermittently.

3. In a device of the class described, the combination with a turntable, a spindle on which the turntable is removably mounted, and means for supporting the spindle, of a friction disc fixed on said spindle, a spring impelled arm journalled on said spindle, an eccentric friction roll pivoted on said arm, resilient means for causing said roll to engage said disc when said arm is moved by its spring, a lever having a part operatively engaging said arm to retract the same and release the roll, and means for intermittently actuating said lever, whereby rotary impulses are transmitted to said spindle.

4. A magnetic motor comprising a base having a standard, a spindle mounted vertically therein, a turntable carried by the spindle, a disc fixed on the spindle, an electromagnet, a pivoted armature drawn in one direction by said magnet, a spring for retracting the armature when released by the magnet, means for making and breaking the circuit to said magnet, an arm rotatable on said spindle, a plate pivoted on said arm, an eccentric roll carried by said plate, and means for causing said roll to impinge on the periphery of said disc when the armature moves in one direction to convey motion thereto and release the disc when moved in the opposite direction.

5. A device of the class described, comprising the combination of a turntable, a spindle on which the turntable is mounted, a support for the spindle permitting the rotation thereof, an element fixed on the spindle, a member mounted to rock about an axis, resilient means for opposing the rocking movement of the member in one direction, means rendered effective by the movement of the member for establishing a driving connection between the member and the element, and means for intermittently actuating said member whereby rotary impulses are transmitted to said spindle.

6. A magnetic motor device comprising the combination of a base, a spindle mounted for rotation on the base, an element fixed on the spindle, a member mounted to rock about an axis, resilient means for opposing the rocking movement of the member in one direction, an electromagnet, an armature adapted to move when the electromagnet is energized, a connection between the armature and the member whereby the movement of the armature causes a movement of the member against the action of said resilient means, means rendered effective by the movement of the member in one direction for establishing a driving connection between the member and the element, and means for periodically interrupting the current flow to said electromagnet.

7. A magnetic motor device comprising the combination of a base, a spindle mounted for rotation on the base, an element fixed on the spindle, a member mounted to rock about an axis, resilient means for opposing the movement of the member in one direction, an electromagnet, an armature associated therewith and adapted to swing when the armature is energized, a connection between the armature and the member whereby the movement of the armature is transmittd to the member to cause a movement thereof against the action of said resilient means, frictional means rendered effective by the movement of the member for establishing a driving connection between the member and the element, and means for periodically interrupting the flow of current to the electromagnet.

8. A magnetic motor device comprising the combination of a base, a spindle mounted for rotation on the base, an element fixed on the spindle, a member mounted to rock about an axis, resilient means for opposing the movement of the member in one direction, an electromagnet, an armature associated with the electromagnet and adapted to swing when the electromagnet is energized, a connection between the armature and the member whereby the movement of the armature causes a movement of the member against the action of said resilient means, means for periodically interrupting the flow of current to the electromagnet, and means rendered effective by the movement of the member in one direction only for establishing a driving connection between the member and the element.

9. A magnetic motor device comprising the combination of a base, a spindle mounted for rotation on the base, an element fixed on the spindle, a member mounted to rock about an axis, resilient means for opposing the movement of the member in one direction, an electromagnet, an armature associated with the electromagnet and adapted to swing when the electromagnet is energized, a connection between the armature and the member whereby the movement of the armature causes a movement of the member against the action of said resilient means, means for periodically interrupting the flow of current to the electromagnet, and a clutching mechanism effective in one direction of movement only of said member for establishing a driving connection between the member and the element.

10. A magnetic motor device comprising the combination of a base, a spindle mounted for rotation on the base, an element fixed on the spindle, a member mounted to rock about an axis, resilient means for opposing the movement of the member in one direction, an electromagnet, an armature associated with the electromagnet and adapted to swing when the electromagnet is energized, a connection between the armature and the member whereby the movement of the armature causes a movement of the member against the action of said resilient means, means for periodically interrupting the flow of current to the electromagnet, and means permitting relative movement of said member and said element in one direction but preventing relative movement in the opposite direction.

11. A magnetic motor device comprising the combination of a base, a spindle mounted for rotation on the base, an element fixed on the spindle, a member mounted to rock about the spindle as an axis, resilient means for opposing the movement of the member in one direction, an electromagnet, an armature associated therewith and adapted to be swung upon energization of the electromagnet, a connection between the armature and the member whereby the movement of the armature causes a movement of the member against the action of said resilient means, means for periodically interrupting the flow of current to the electromagnet, and means rendered effective upon the movement of the member in one direction for locking said member and element together to move as a unit.

12. A magnetic motor device comprising the combination of a base, a spindle mounted for rotation on the base, an element fixed on the spindle, a member mounted to rock about an axis, resilient means for opposing the movement of the member in one direction, an electromagnet, an armature associated with the electromagnet and adapted to swing when the electromagnet is energized, a connection between the armature and the member whereby the movement of the armature causes a movement of the member against the action of said resilient means, means for periodically interrupting the flow of current to the electromagnet, and cooperating means carried by said member and said element for establishing a driving connection therebetween in one direction of movement of said member.

13. A magnetic motor device comprising the combination of a base, a spindle mounted for rotation on the base, an element fixed on said spindle, a member mounted to rock about an axis, resilient means for opposing movement of said member in one direction, an electromagnet, an armature therefor adapted to swing when the electromagnet is energized, means for periodically interrupting the flow of current to the electromagnet, a connection between the member and the armature whereby the swinging of the armature causes a rocking of the member against the action of said resilient means, and means carried by said member adapted to cooperate with a part of said element to effect a one-way driving connection between said member and said element.

14. A magnetic motor device comprising the combination of a base, a spindle mounted for rotation on the base, an element fixed on the spindle, a member mounted to rock about an axis, resilient means for causing a rocking movement of the member in one direction, a plate carried by the member, frictional driving means carried by the plate and adapted to engage the element to effect a connection between the element and the member, the said driving means being rendered effective by the movement of the member in one direction, and means for giving periodic movements to the member to impart intermittent impulses to the spindle.

In testimony whereof I affix my signature.

JOHN GREER RUCKELSHAUS.